3,170,849
RECOVERY AND PURIFICATION OF C-ALKYL IMIDAZOLES BY AZEOTROPIC DISTILLATION

Merwin D. Oakes, Chester, Pa., assignor to Air Products and Chemicals, Inc., a corporation of Delaware
No Drawing. Filed Sept. 15, 1961, Ser. No. 138,251
5 Claims. (Cl. 202—42)

The present invention relates to the recovery and purification of C-alkyl imidazoles having 1 to 2 carbon atoms in the alkyl substituent. The invention is concerned principally with the purification of a product containing alkyl imidazole to free the same of accompanying components boiling close thereto and not separable therefrom by ordinary simple distillation procedures, without thermal degradation of the products.

The invention is applicable to separation of desired alkyl imidazoles from accompanying components in a synthesis reaction mixture as well as to the purification of alkyl imidazoles in a narrow distillate comprising components boiling in the range of plus to minus 5° C. of the atmospheric boiling point of the alkyl imidazoles sought to be isolated. In typical instances, such narrow boiling fractions or cuts are produced by the fractionation of a reaction mixture obtained in the production of the alkyl imidazole. A practical method for the production of C-alkyl imidazoles is described by William E. Erner in U.S. Patent No. 2,847,417, issued August 12, 1958. In accordance with the method therein described, 2-methyl imidazole is obtained by reacting ethylene diamine with acetic acid over solid dehydrocyclization catalyst; in the same manner ethylene diamine reacted with propionic acid yields 2-ethyl imidazole. The unpurified crystalline product recovered from the reaction mixture, in the case of 2-methyl imidazole, has a melting point of 136–141° C. and is estimated to be of about 95% purity. By dehydrogenation of the corresponding alkyl imidazoline compounds, there are obtained alkyl imidazoles of about this same purity.

In accordance with the present invention, impure 2-alkyl imidazoles and product fractions containing 2-alkyl imidazoles are purified by distillation in the presence of an added larger quantity of alkyl aromatic hydrocarbon composition effective in increasing the relative volatility of the particular alkyl imidazole, said alkyl aromatic hydrocarbon boiling entirely or largely within the range of from 10 to 40° C. below the boiling point of the alkyl imidazole.

Illustrative of the invention as applied to the purification or separation of 2-methyl imidazole, which boils at about 268° C., there may be employed as co-distilland alpha or beta methyl naphthalene (alpha methyl naphthalene B.P. 245° C., beta methyl naphthalene B.P. 241° C.) or hydrocarbon mixtures boiling in the approximate range of these and containing either or both of these compounds in 85% or higher purity. These same methyl naphthalenes or their mixtures may also be employed for purification or separation of 2-ethyl imidazole (B.P. 270–275° C.). These alkyl naphthalenes are believed to form binary azeotropes with the methyl or ethyl imidazole which boil at temperatures lower than that of either the alkyl imidazole or of the methyl naphthalene employed. In distilling the mixture of crude alkyl imidazole and the alkyl naphthalene the desired binary mixture will appear in the overhead and can be separately recovered as a narrow boiling cut (over a few degrees temperature range) at a fairly distinct plateau in the distillation. As the temperature again begins to rise, the collection of this cut should be discontinued.

Depending upon the impurities present in crude alkyl imidazole being purified, it is quite possible that other components of the mixture may also form binary azeotropes with the hydrocarbon co-distilland employed. Such formation of other azeotropes, however, will not interfere with the operation of the process for the recovery of the desired purified alkyl imidazole, since any binary azeotropes formed with such other contaminant component will have a boiling point different from that of the alkyl imidazole-alkyl naphthalene system. Moreover, since any particular contaminant will probably be present in only relatively small amount, the outside possibility of forming a ternary azeotrope system with the alkyl imidazole and the added co-distilland is of no practical significance, since in such system, even if the ternary system boils below that of the desired binary azeotrope, it will be boiled off earlier, and not interfere with the purity of the principal alkyl imidazole cut recovered.

Other alkyl naphthalenes boiling within 10 to 40° C. of 2-methyl and/or 2-ethyl imidazole, which can be employed to increase the relative volatility of these compounds, include: alpha and beta ethyl naphthalene. Monocyclic alkyl aromatic compounds falling within the indicated useful boiling range include: phenyl hexanes, phenyl heptanes, methyl dipropyl benzenes, diphenyl methane and various other tri- to penta-substituted-alkyl benzenes, as, for example trimethyl diethyl-benzene. Since alpha and beta methyl naphthalene are the most readily available of the hydrocarbon compounds named, the others are of less practical interest.

EXAMPLE I (a) Ethylene diamine acetate was prepared by addition of excess glacial acetic acid (1% excess of stoichiometric to one amine group) in a stirred kettle immersed in a cold water bath, temperature being maintained not to exceed 140° F. The obtained solution was preheated to reaction temperature and passed over steamed platinum-alumina catalyst (substantially chloride-free) together with 4 moles/mole hydrogen at atmospheric pressure and at 700° F., 0.75 LHSV (liquid hourly space velocity). The reactor effluent contained both solid and liquid phases when cooled to room temperature. The effluent was dissolved in isopropanol to maintain liquid phase in subsequent analysis and recovery of 2-methyl imidazole.

(b) A portion of the isopropanol solution of the reaction mixture was subjected to straight distillation and the heart cut taken off as a liquid through a heated condenser into collection jars, wherein the product solidified. The recovered product was off-color as collected. In several repeated runs using straight distillation for recovery of the 2-methyl imidazole, the collected heart cut distillate was either off-color as collected or went off-color in several hours and even more significantly, a major part of the product is polymerized and not recoverable.

It appears that when the reactor effluent is distilled at normal or reduced pressure, a substantial fraction is received in the fore-runs comprising unconverted starting materials, water, and the like. Then, as the principal product boiling range is reached, crystallizable 2-methyl imidazole is taken over but only a part of the 2-methyl imidizaole made. Column temperatures begin to rise above the 2-methyl imidazole boiling point and the distillation is through. Apparently the reaction products are readily condensed to dark tarry materials at temperatures approaching the 2-methyl imidazole boiling point (268° C.). Condensation in the still pot is further evidenced by ammonia and amine odors released during the distillation. This high loss of product is illustrated by a typical direct distillation: Charge, 2-methyl imidazole reactor effluent, 210 p.b.w., 20 theoretical plate "Pod," columns 10/1 reflux.

|  | Distillate, p.b.w. | Temp., °C. |
| --- | --- | --- |
| Fore-runs | 122 | to 99 |
|  | 17 | to 261 |
| Product cut | 7 | to 264 |
|  | 15 | to 267 |
|  | 16 | to 269 |
|  | cut off | temp. rise |
| Total recovered | 177 |  |
| 2-methyl imidazole cut 55/210=26.2%. |  |  |
| Residue and unaccounted 33/210=15.7%. |  |  |

This distillation produced a 26.2% yield of a 2-methyl imidazole concentrate on the total reactor effluent. The product was pink to darker in color. Whereas 58% of charge recovered as forerunnings might be recycled and reused in part, the high boiling bottoms are black, tarry and not reusable.

Several additional runs made by straight distillation of imidazole concentrates gave results as follows:

| Reactor | 2-methyl imidazole (p.b.w.) | | M.P., °C. |
| --- | --- | --- | --- |
|  | Analysis, VF | Recovered by Distill. |  |
| Glass | 83 | 73 |  |
| Glass | 96 | 80 | 130–140 |
| Stainless Steel | 100 | 84 | 131–141 |

In each case the 2-methyl imidazole found by vapor fractometer analysis was notably more than that recovered by redistillation. Further purification was by recrystallization from solvents.

(c) A check run was made to determine whether the off-color described in (b) above was due to oxidation of the hot product. In the check run, the straight distilled heart cut was flaked on a chilled drum and the flakes collected in a nitrogen-purged glass receiver. The product went off-color in several hours (M.P. 130–137° C.). The other recovered products from straight distillation melted in the range of from about 130 to 140° C.

Apparently the impurities causing the product to be off-color distill over with the principal product and these products deteriorate further on exposure to light and/or air and quick cooling (flaking) the product has little, if any, stabilizing effect.

(d) In an attempt to improve the color and purity of the straight distilled 2-methyl imidazole product, a sample of the tan colored flaked product from (c) above was recrystallized from toluene and filtered, reslurried with n-pentane and again filtered, then dried in moisture-free air. Although the melting point was thereby raised to 145° C., (M.P., 0 ° C. [literature] for 2-methyl-imidazole=144.5–145.5) the product was off-white and deteriorated further on several hours standing and was decidedly of poorer appearance than the product obtained by co-distillation with methyl naphthalene described below.

EXAMPLE II

Cut 1.—Another sample of the isopropanol solution from Example 1(a) above, containing 78 parts by weight 2-methyl imidazole reactor effluent and 176 parts isopropanol, was charged to a Podbielniak still having a rating of 20 theoretical plates at total reflux. A first fraction was taken off at 1:1 reflux ratio to a vapor temperature of 78° C. This cut amounted to 200 parts by weight, and included in addition to the known amount of alcohol some 24 parts of material which was mostly water.

Cut 2.—After removal of the fore-runs (cut 1) the still was shut down and 400 parts of a mixture of alpha and beta methyl naphthalene added to the still pot. The alkyl aromatic additive was employed in excess to provide bottoms for the distillation. The mixed alkyl naphthalenes employed in the codistillation analyzed 68.2% alpha methyl naphthalene by weight, 27.7% beta methyl naphthalene, and 4.1% other $C_{10}$ aromatics (B.P. 240.5–244° C.).

The second cut was made at a 2:1 reflux ratio in the boiling range of 78–227° C. and amounted to 29 parts recovered. Some moisture was apparently present in this cut. No solids were separated at room temperature (60° F.).

Cut 3.—The third cut was made at a 2:1 reflux ratio in the boiling range of 227–234° C., at which 5 parts were recovered. Slight signs of solids were present.

Cut 4.—The fourth cut appeared to be an azeotrope and amounted to 288 parts. It was collected over the range of 234–243° C., although the main portion of this cut came over at a temperature plateau at about 237–238° C. The collection was discontinued when the distillation temperature rose above this level.

Cut 5.—This cut was taken at 243° C., 2:1 reflux ratio and amounted to 42 parts. No solids were present at 60° F.

Cut 6.—The last cut of 70 parts was made at 2:1 reflux ratio to 244° C. No solids were present at 60° F. The recovered bottoms amounted to about 26 parts.

The product in cut 4 on standing at room temperature yielded crystalline 2-methyl imidazole which was separated from the liquid methyl naphthalenes by vacuum filtration. The solubility of 2-methyl imidazole in the mixed methyl naphthalenes at room temperature is about 0.23 gram per liter. The unwashed product was of good white color but had a wide melting range (130–147° C.), apparently due to occluded methyl naphthalenes.

Mother liquor recovered from crystallization of 2-methyl imidazole from the azeotrope with methyl naphthalene is composed of methyl naphthalene saturated with 2-methyl imidazole and is advantageously recycled to the azeotropic distillation system for reuse. The product obtained on azeotropically distilling crude 2-methyl imidazole with recycled methyl naphthalene (mother liquor), after toluene and pentane washing, as described below, had a melting point of 142–146° C. indicating a 2-methyl imidazole product of high quality. Where the product recovery is not carried out in balance with reactor effluent production, it has been found advantageous to add to the effluent product in the run down lines roughly an equal volume of a stable low boiling solvent such as isopropanol. The resultant solution remains liquid to room temperature or below, thus avoiding the necessity of maintaining heated lines, surge tanks and storage tanks and assuring an easily handled liquid product. Since the low boiling solvent is readily removed in the fore-run of the distillation, the solvent does not interfere with 2-methyl imidazole recovery. Other inert low boiling solvents can be used in place of isopropanol, such as: ethanol, acetone, etc.; preference being had for those boiling in the range of 50–100° C.

Purification

Sample A.—A sample portion of the recovered crystalline material from the vacuum filtration consisting of 71.4% 2-methy imidazole, 26% methyl naphthalene and 2.6% other impurities was washed with toluene then with pentane. Analysis by vapor fractometer indicated that some 2.5% of methyl naphthalenes were still present. This product, 97.3% 2-methyl imidazole, had a melting range of 138–143° C.

*Sample B.*—Another sample of the above product from vacuum filtration was recrystallized from toluene solution (4 liters/kg. cake) then washed with pentane. The obtained product analyzed 99.7% 2-methyl imidazole and had a fairly sharp melting point of 141–154° C. The impurities were products associated with the mixed methyl naphthalenes.

Samples of the purified product recovered from azeotropic distillation were stored in the dark for six months. Examination at the end of a three-month period showed that the color remained essentially unchanged in all samples. A control sample of the straight distilled material recrystallized as in Example 1(*d*) had developed color on similar storage in several hours. Examination of the samples at the end of six months indicated that the Sample A (washed with toluene and pentane) had yellowed, while Sample B (recrystallized from toluene and washed with pentane) was only slightly changed to an off-white color.

Hand-mixed foams prepared with 2-methyl imidazole recovered by azeotropic distillation with methyl naphthalenes were free of naphthalenic odor.

EXAMPLE III

A still charge of 15 parts of crude 2-methyl imidazole (140–143° C. M.P.) and 70 parts methyl naphthalenes was distilled in a high temperature Podbielniak column, taking off 45.0 parts by weight to 458° F. and 16.3 parts by weight to 500° F. at which point more methyl naphthalene was added. The principal (azeotrope) fraction distilled over between 457–460° F. and from the temperature rise it was apparent that the initial charge of 70 parts methyl naphthalenes/15 parts of 2-methyl imidazole was insufficient to carry over all the 2-methyl imidazole present. The distillation was interrupted for the addition of 20.0 parts of methyl naphthalenes after which distillation was resumed to take off
18.0 parts by weight to 460° F. and
4.8 parts by weight to 465° F. with
1.0 part by weight drainings and
3.5 parts by weight bottoms The initial ratio of about 5:1 methyl naphthalene was insufficient while, with the added methyl naphthalene to at least about 7 parts by weight per part of 2-methyl imidazole, the requirement for azeotroping was satisfied.

Cut 1 above yielded_____ 6.8 parts of crystals.
Cuts 2 and 3 above yielded_ 6.3 parts of crystals.
　　　　　　　　　　　　　————
　　　　　　　　　　　　　13.1 parts of 15 or 87.3%
　　　　　　　　　　　　　2-methyl imidazole recovery.

This product had a melting point of 143–145° C. and was white in color.

EXAMPLE IV

Crude 2-methyl imidazole containing a high percentage of 2-methyl imidazoline which had been collected as fore-runnings from earlier distillations was fractionally distilled in a "25 plate" high temperature Podbielniak column. By direct distillation roughly about 60% of the charge was taken off as low boiling imidazolines, after which methyl naphthalenes were added continuously and the principal product taken off in the azeotrope boiling range (236–238° C.). Above this distillation temperature no more methyl naphthalene was added and a small amount of tailings and bottoms were recovered.

The 2-methyl imidazole crystallized from the azeotropic fractions (236–238° C.) was washed with toluene and then with n-pentane. The product was white in color and had a minimum melting point of 146° C.

Obviously many modifications and variations of the invention as hereinbefore set forth may be made without departing from the spirit and scope thereof, and therefore only such limitations should be imposed as are indicated in the appended claims.

What is claimed is:

1. The method of recovering a C-alkyl imidazole selected from the group consisting of C-methyl imidazole C-ethyl imidazole from a mixture comprising C-alkyl imidazole and at least one component boiling within five centigrade degrees of the atmospheric boiling point of the said imidazole, which method comprises distilling said mixture in the presence of an added larger quantity of an alkyl aromatic hydrocarbon which boils at least largely in the range of 10 to 40 centigrade degrees below the boiling point of the C-alkyl imidazole, collecting from the distillation a narrow distillate cut containing the C-alkyl imidazole in admixture wtih said alkyl aromatic hydrocarbon and separating the C-alkyl imidazole from said distillate cut.

2. The method according to claim 1 wherein the C-alkyl imidazole is 2-methyl imidazole and said alkyl aromatic hydrocarbon consists essentially of methylnaphthalene.

3. The method according to claim 1 wherein the C-alkyl imidazole is 2-ethyl imidazole and said alkyl aromatic hydrocarbon consists essentially of methylnaphthalene.

4. The method of recovering a C-alkyl imidazole selected from the group consisting of C-methyl imidazole and C-ethyl imidazole from a C-alkyl imidazole fraction containing compounds having atmospheric boiling points close to the C-alkyl imidazole, which method comprises diluting said fraction with an inert, stable, low-boiling organic solvent to maintain the same in liquid state, subjecting the diluted liquid to fractional distillation, removing by such distillation fore-runs including at least a portion of said organic solvent at a temperature below the boiling point of the C-alkyl imidazole, adding to the distilland alkyl aromatic hydrocarbon boiling at least largely 10–40 centigrade degrees below the C-alkyl imidazole, continuing said distillation, collecting over a narrow temperature range a distillate cut containing a C-alkyl imidazole in admixture with the alkyl aromatic hydrocarbon, cooling the admixture to effect crystallization of the C-alkyl imidazole and recovering the imidazole crystals.

5. The method of claim 4 wherein the C-alkyl imidazole is 2-methyl imidazole and said alkyl aromatic hydrocarbon consists essentially of methylnaphthalene.

References Cited in the file of this patent
UNITED STATES PATENTS 2,404,300　　Kyrides et al. _____ July 16, 1946
2,847,417　　Erner _____ Aug. 12, 1958

OTHER REFERENCES

Carlson Extractive and Azeotropic Distillation, in Weissberger Technique of Organic Chemistry, vol. 4 (Distillation), pages 359–64, N.Y., Insterscience, 1951.

Coulson et al.: Laboratory Distillation Practice, pages 136–37, London, Newnes, 1958.

Azeotropic Data (No. 6 of Advances in Chemistry, American Chemical Society), pages 72 and 104–5, Washington, D.C., American Chemical Society, 1952.

Lecat: Chem. Abstracts, volume 42, column 104 (1948).

UNITED STATES PATENT OFFICE
CERTIFICATE OF CORRECTION

Patent No. 3,170,849                                February 23, 1965

Merwin D. Oakes

It is hereby certified that error appears in the above numbered patent requiring correction and that the said Letters Patent should read as corrected below.

Column 5, line 5, for "141-154° C." read -- 141-143° C. --.

Signed and sealed this 24th day of August 1965.

(SEAL)
Attest:

ERNEST W. SWIDER                              EDWARD J. BRENNER
Attesting Officer                                   Commissioner of Patents